Aug. 28, 1928.
C. W. OLSON
1,682,236
ROTATABLE WINDOW
Filed March 29, 1924
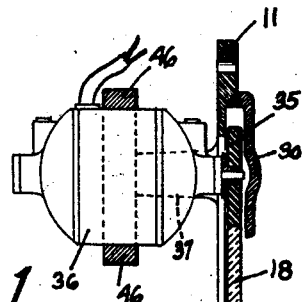
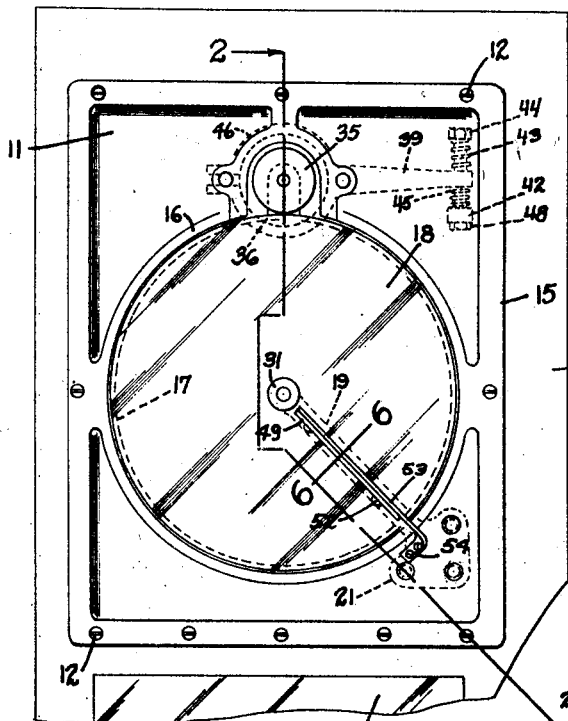
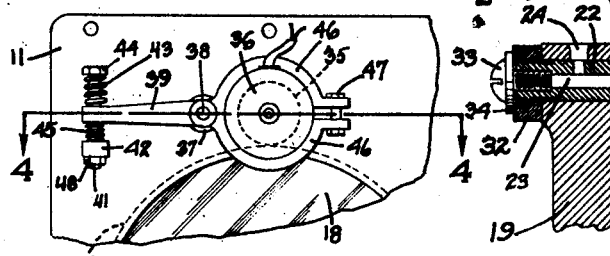
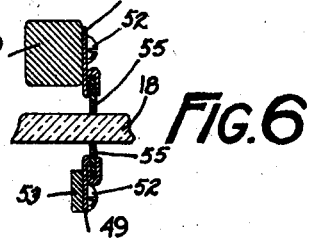
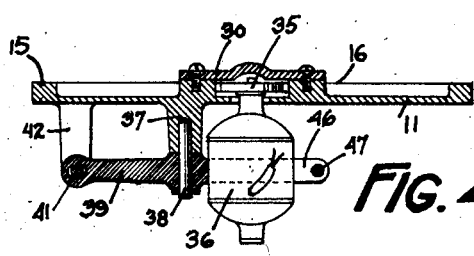
Inventor
Carl W. Olson
By Paul, Paul + Moore
Attorneys Patented Aug. 28, 1928.

1,682,236

UNITED STATES PATENT OFFICE.

CARL W. OLSON, OF MINNEAPOLIS, MINNESOTA, ASSIGNOR TO AMERICAN SAFETY EQUIPMENT CORPORATION, OF MINNEAPOLIS, MINNESOTA, A CORPORATION OF DELAWARE.

ROTATABLE WINDOW.

Application filed March 29, 1924. Serial No. 703,004.

This invention relates to improvements in windows which are rotatable to remove materials or particles which tend to obscure vision therethrough. It is old in this art to provide rotatable windows which are adapted either by centrifugal force alone or by mechanical wipers or by both to remove rain, mist, snow, sleet, ice, fog, etc. from the window. Such devices are particularly useful in the engineer's cab of locomotives, the front platform of street-cars, the pilot's cabin of ships, windshields of motor vehicles and motor-boats, etc. It is a matter of common knowledge and experience that the atmospheric elements accumulate upon the windows of such moving objects and that it is with great difficulty that the obvious disadvantages are overcome. Heretofore, such rotatable disks of glass have been mounted upon a spindle which is driven at a relatively high rate of speed. The strains of the starting torque are disastrous to the glass disks as well as the torque-strain of acceleration and speed-maintenance. The power is applied at the disk-axis and is tangentially distributed to all parts of the glass. Thin light-weight glass reduces the inertia to be overcome by torque but such glass is easily shattered by its inherent weakness or by objects striking against it, while heavy plate glass multiplies the inertia and the resultant twisting strain upon the glass. Further, a driving mechanism to, and at, the axial spindle obscures vision through a greater or lesser portion of the window.

In this novel invention, the disk is rotatable freely upon an axial spindle while the driving of the disk is effected adjacent its periphery whereby all torsional strains are minimized if not obviated and a heavy glass may be used without its former disadvantages while its benefits are all retained. In addition to its free center mounting and its peripheral drive, the invention includes the provision of a frictional drive. Furthermore, the rotatable driving element is preferably a wheel, roller or disk having its driving peripheral portion of a flexible or expandible material such as felt, fiber, rubber or compositions, thereof. The advantage of such a driving medium resides in the fact that such driving element may be rotated at a relatively high rate of speed so that the peripheral material is radially expanded by the generated centrifugal force. Hence, the element may be initially set to engage lightly the periphery of the glass disk so that the disk is gradually accelerated. An advantage resides in the fact that the starting strains upon the glass disk are minimized. Such construction is also advantageous where, as is common, these rotatable disks are driven by electric motors. The strain upon the motor is not only reduced but the necessity of expensive and cumbrous rheostats is avoided.

The object therefore of this invention is to provide an improved rotatable window.

Other objects of the invention will more fully appear from the following description and the accompanying drawings and will be pointed out in the annexed claims.

In the drawings there has been disclosed a structure designed to carry out the objects of the invention but it is to be understood that the invention is not confined to the exact features shown as various changes may be made within the scope of the claims which follow.

In the drawings:

Figure 1 is a view in front elevation of the invention, its frame and a panel upon which the frame is mounted;

Figure 2 is a vertical sectional view upon the irregular line 2—2 of Figure 1;

Figure 3 is a partial detailed view to show the motor mounting;

Figure 4 is a cross-sectional view on the line 4—4 of Figure 3;

Figure 5 is a cross-sectional view on the line 5—5 of Figure 2; and

Figure 6 is an enlarged detailed view in cross-section on the line 6—6 of Figure 1.

While this novel invention is adapted to a plurality of specific uses as above noted, it is here shown for purposes of explanation in a form particularly adapted for railroad work, i. e., for use in the engineer's cab of a locomotive.

The frame 11 of this device is preferably of metal and is here shown as of a rectangular external conformation adapted to be secured by the screws 12 to the window-frame or door 13 commonly provided in the front of the locomotive cab to permit view by the engineer of the track ahead. As is usual, these locomotive doors or windows are provided with one or more openings. In the form here shown, the usual window has been removed from the upper opening while the lower window 14 is shown as in its usual place. The frame 11 of the device is adapted to be substituted for the upper window and has an integral thickened marginal portion 15 and an interior thickened substantially annular portion 16. The annular portion has an annular flange 17 which inwardly extends in a radial direction. The rotatable window is in the form of a disk 18 of transparent material, preferably glass and this disk is so mounted that its outer surface is at least flush with the outer surface of the annular portion 16. As is shown in Figure 2, its surface is slightly beyond to assure the discharge of material tending to rest thereon.

The disk 18 is freely rotatably borne at its axis and a bearing therefor is preferably carried by the frame. A bearing bracket 19 is provided with a plate 21 adapted to be bolted or riveted to the frame 11 and the bracket extends radially to present the bearing in alinement with the axis of the circular space defined by the annular portion 16 of the frame. A bearing stud 22 extends through the terminal portion of the bracket 19 in fixed relation thereto and projects in alinement with the axis of the circular opening. This bearing stud has an axial oil chamber 23 within which lubricating oil may be introduced by the recess 24 extending through the bracket 19 and stud 22. An oil duct 25 extends from the oil chamber 23 to the exterior of the bearing stud. A flanged sleeve 26 is mounted to rotate freely upon the bearing stud 22 and has an inner terminal flange 27 effecting a running fit with the similar flange 28 of the bearing stud 22. The glass disk 18 is axially apertured and is adapted to be positioned upon the flanged sleeve 26. A backing ring 29 may be interposed between the disk 18 and the flange 27 while a nut 31 is received in threaded engagement with the sleeve 26 and may be turned down to hold the disk 18 to the freely rotatable sleeve 26. The inner end of the bearing stud is threaded to receive the nut 32 while both ends of the bearing stud are axially counterbored to receive the similar screws 33 carrying the washers 34.

The driving of this disk which is thus freely rotatable upon its center bearing is effected adjacent the periphery of the disk. As here shown it is effected by a frictional engagement of a small roller or wheel 35. This wheel is preferably made of expansible material such as rubber or one of its compositions whereby the rotation of this wheel at a high rate of speed will cause the diameter thereof to be increased to effect a more forceful engagement with the periphery of the disk. This driving element or wheel is preferably so mounted that while at rest its engagement with the disk is relatively light so that, upon starting, slippage between the wheel and disk may result while the rotation of the wheel at a high rate of speed will cause its effective diameter to expand and thus automatically obviate the slippage. The acceleration of the disk is thus relatively gradual and not only is the starting strain upon the prime mover reduced but also the torque-strain upon the glass itself is reduced. While this reduction of the strain upon the glass disk of this frictional drive is of advantage, the greater advantage is believed to reside in this construction whereby the disk is freely borne at its center and is driven from its periphery.

The prime mover is here shown as an electric motor 36 to the shaft of which is secured the wheel 35. A cap plate 30 as shown in Figures 2 and 4 is preferably screwed to the outside face of the frame 11 to protect the wheel 35 from exposure to the elements. It may be noted that in Figure 1 this cap 30 has been removed. This motor is preferably provided with an adjustable mounting upon the frame 11. As is shown in Figure 4, a boss 37 projects from the inner face of the frame 11 and is apertured to receive the pivot pin 38 for the lever and mounting of the motor. The lever-arm 39 upon one side of the pivot pin is terminally apertured to receive a bolt 41 secured to a lug 42 integrally provided by the frame 11. A compression spring 43 is coiled about the bolt 41 between the arm 39 and the nut 44, while a second compression spring 45 is likewise coiled about the bolt 41 between the arm 39 and the lug 42. The spring 43 is of greater strength than the spring 45 because the weight of the motor is counter-balanced by the spring 43. The portion of the lever upon the other side of the pivot pin 38 is split to provide the forks 46 which are adapted to embrace the motor housing and are terminally offset so that the bolt 47 may hold the forks 46 in motor embracing position. The motor is thus held in a counter-balanced position and the tension of the springs 43 and 45 may be changed by turning these adjusting screws 44 and 48 of the bolt 41. The electrical energy for the motor may be received from the locomotive generating plant for the lighting system so that at the present time there is preferably used a thirty-two volt motor which is adapted to drive the glass disk at approximately one thousand revolutions per minute. In the case of motor vehicles, it is preferable to employ a six or twelve volt motor which is driven from the usual storage battery.

While the rapid rotation of the glass disk will tend to remove vision obscuring material tending to rest thereon, it is deemed preferable to add an elongated member mounted to deflect or break up any circular air currents which are tended to be set up adjacent the rotating disk surface. This may be accomplished by the provision of what is commonly known in this art as a wiper. As best shown in Figures 2 and 6, it consists of a strip 49 of metallic sheet material having a pair of spaced elongated slots 51 adapted to receive the screws 52 whereby the strip may be held in adjusted position upon the bracket 53 with an offset end 54 adapted to be bolted to the outer face of the frame 11. A marginal portion of the strip adjacent the disk 18 is bent upon itself to provide a marginal recess firmly to hold an elongated strip 55 preferably of rubber. The rubber strip 55 is thus adjustably mounted so that it may be spaced from the surface of the rotatable disk 18 or may be placed in contact therewith. In tests with locomotives and motor vehicles excellent results have been secured when the strip 55 is spaced from the outside surface of the glass disk. Applicant's theory being that the wiper functions as a wind break to deflect or break up any circular air currents tended to be set up by the rapidly rotating disk. This function is also retained when the strip 55 physically engages the surface of this rotating disk and actually wipes the same. In the locomotive type here shown it has been found preferable to extend the wiper radially upward on an angle of substantially 45°.

In addition to the use of the outside wiper, it has been found preferable to provide a similar wiper for the inside surface of the disk. This inside wiper is particularly useful during cold weather when the glass disk is substantially of the outside temperature and the moist heated air of the engineer's cab coming in contact with the inner surface tends to deposit a fine mist thereon. As here shown, a similar wiper 55 is carried by a similar strip 49 which is shown in Figures 2 and 6 as being adjustably mounted by the screws 52 upon the bearing bracket 19.

Having thus described my invention what I claim as new and desire to secure by Letters-Patent, is:

1. A device of the class described comprising a disk rotatably supported, a pivoted lever carrying on one arm a motor, the shaft of said motor having a driving wheel in engagement with the periphery of the disk, and cushioning means engaging with the opposite arm of the lever.

2. A device of the class described comprising a disk rotatably supported, a pivoted lever carrying on one arm a motor, the shaft of said motor having a driving wheel in engagement with the periphery of the disk, and adjustable resilient means engaging with the opposite arm of the lever.

3. A device of the class described comprising a frame having an opening and a narrow arm projecting across the opening, a transparent disk journaled on the arm in opposition to the opening, a wiper carried by the disk supporting arm, and arranged to intercept circular air current adjacent the disk, and means for rotating the disk.

4. A device of the class described comprising a frame having an opening, a disk rotatably supported to overlap the opening, a lever pivoted to the frame and carrying on one arm a motor, the shaft of said motor having a driving wheel in engagement with the periphery of the disk, and springs engaging against opposite sides of the opposite arm of the lever.

5. A device of the class described comprising a frame having an opening, a disk rotatably supported to overlap the opening, a lever pivoted to the frame and carrying on one arm a motor the shaft of said motor having a driving wheel in engagement with the periphery of the disk, and springs engaging against opposite sides of the opposite arm of the lever, one of the springs exerting greater pressure than the other.

6. A device of the class described comprising a frame having an opening, a disk rotatably supported to overlap the opening, a lever pivoted to the frame and carrying on one arm a motor the shaft of said motor having a driving wheel in engagement with the periphery of the disk, and springs engaging against opposite sides of the opposite arm of the lever, one of the springs acting to counter-balance the weight of the motor and the other acting to overcome in some predetermined degree the motor-balancing effect of the first mentioned spring, to press the driving wheel against the disk.

7. A device of the class described comprising a disk rotatably mounted, a pivoted lever having a motor on one arm, the shaft of the motor having a driving wheel engaging the periphery of the disk, a bolt independently adjustably supported and loosely traversing the other arm of the lever, and springs upon the bolt at opposite sides of the arm and under compression against the arm, the arrangement being such that the tension of the springs is adjusted when the bolt is translated in an axial direction.

In witness whereof, I have hereunto set my hand, this 26th day of March, 1924.

CARL W. OLSON.